No. 864,863. PATENTED SEPT. 3, 1907.
D. M. SAMUELSON.
FERTILIZER DISTRIBUTER.
APPLICATION FILED JULY 5, 1906.
2 SHEETS—SHEET 1.
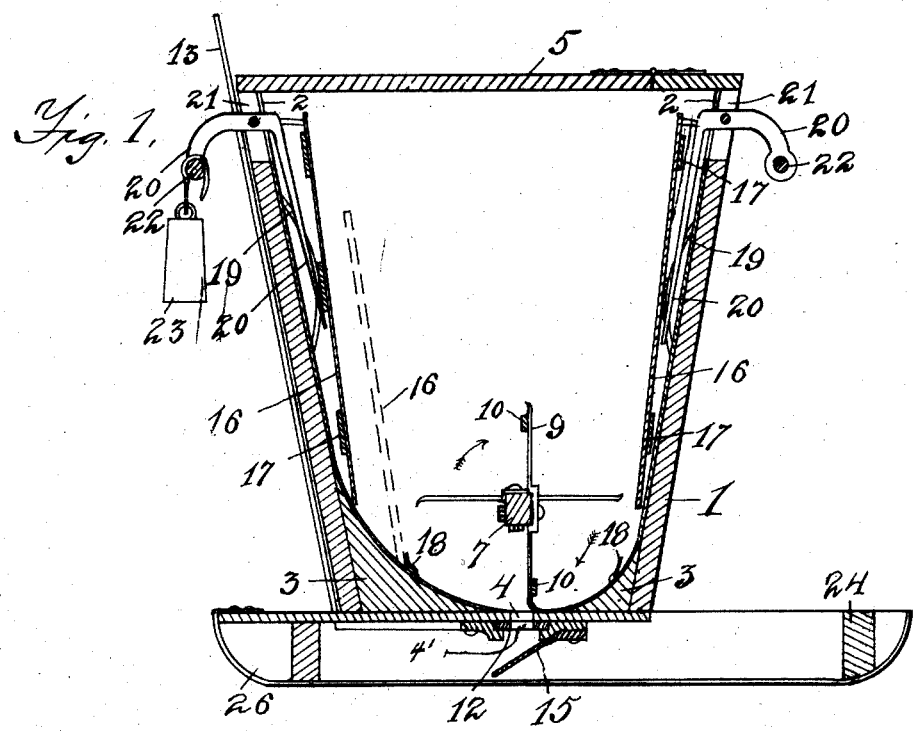
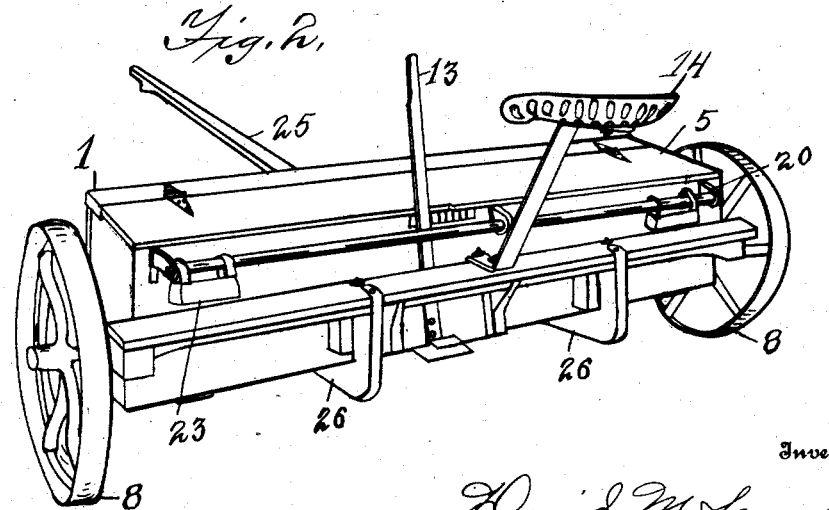

No. 864,863. PATENTED SEPT. 3, 1907.
D. M. SAMUELSON.
FERTILIZER DISTRIBUTER.
APPLICATION FILED JULY 5, 1906.
2 SHEETS—SHEET 2.
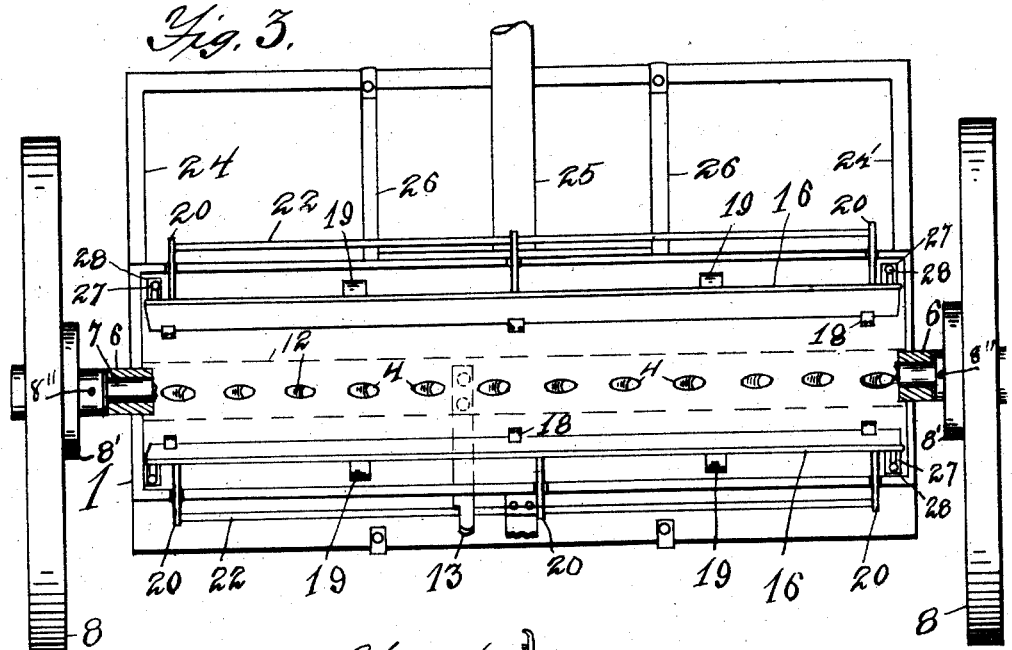
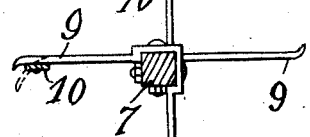
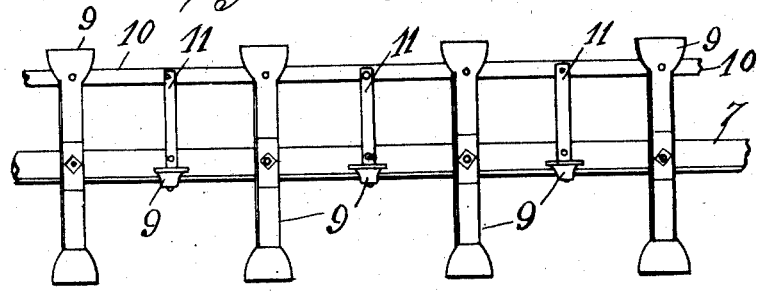
Inventor
David M. Samuelson
Witnesses
By S. Arthur Baldwin,
Attorney

UNITED STATES PATENT OFFICE.

DAVID M. SAMUELSON, OF CHANDLERS VALLEY, PENNSYLVANIA.

FERTILIZER-DISTRIBUTER.

No. 864,863.

Specification of Letters Patent.

Patented Sept. 3, 1907.

Application filed July 5, 1906. Serial No. 324,725.

*To all whom it may concern:*

Be it known that I, DAVID M. SAMUELSON, a citizen of the United States, and a resident of Chandlers Valley, in the county of Warren and State of Pennsylvania, have invented new and useful Improvements in Fertilizer-Distributers, of which the following, taken in connection with the accompanying drawings, is a full, clear, and exact description.

The invention relates to improvements in distributers for fertilizer; and the object of my improvement is to provide an agitator and feeder having resilient arms to force the fertilizer through the openings; and second, the provision of movable sides for the hopper with means for agitating the same and pressing them inward so as to contract the sides of the hopper as the amount of the fertilizer material diminishes and thereby prevent the material from "bridging" or otherwise clogging in the machine so that it cannot be fed out.

There are a number of fertilizing materials used to feed the lands in different portions of the country which are extremely hard to distribute, such as ashes, lime, and like substances which easily "bridge" in the hopper, and apparently no angle of inclination of the sides of the hopper can be arranged which will overcome this difficulty. The loose sides of my hopper are constantly shaken and work up and down by the motion of the machine, and can easily be further agitated by the mechanism shown, to insure even distribution of any kind of fertilizing material.

In the drawings Figure 1 is a sectional view of the hopper showing the agitator and movable sides with means for agitating the same. Fig. 2 is a rear view of the closed machine. Fig. 3 is a plan view of the machine with the top and agitator removed showing the arrangement of the openings in the bottom of the hopper and the movable sides. Fig. 4 is a sectional view of the feed agitator; and Fig. 5 is a side elevation of a portion of the feed agitator.

Similar numerals refer to corresponding parts in the several views.

The numeral 1 indicates the hopper which is formed with sides having a slight indentation, as shown, and a suitable sheet metal lining 2. The bottom of the hopper has wood fillings 3 to give the proper curve so that the powdered material will work toward the openings 4.

Hopper 1 has a lid 5 which is hinged thereto and said hopper is mounted on suitable boxes 6 on axle 7. Axle 7 is made rectangular within hopper 1 and the ends from bearings 6 outward are made round. The wheels 8 are made with the ratchet 8' on their inner sides, one part of said ratchet being attached to the axle by the pin 8'', the other part turning with the wheel as is common in harvesting and mowing machines. This arrangement of the ratchet allows one wheel to stand still and the other to revolve in turning corners and also allows the machine to back up without revolving the axle.

The square axle 7 within the hopper 1 has attached thereto at regular intervals a series of cross-wise spring paddles or agitators 9 extending out each side of the axle. Paddles 9 are made of thin spring steel so as to be resilient, particularly toward their outer ends. The outer ends also are made slightly broader than the central portion in blade form in order to cover the holes 4 in the bottom of the hopper, the holes 4 being placed in series to correspond to said paddles. Paddles 9 are formed with a slight bend which conforms to the sides of the square axle 7 and thereby keeps the paddles 9 from turning sidewise. The paddles are secured to the axle by suitable bolts which hold them firmly in place. The alternate paddles are preferably turned in opposite directions, so that the paddles extend in four different directions from axle 7.

In order to keep the material from "bridging" between the paddles 9, one or two lengthwise bars 10 are provided which are firmly secured to the paddles near their outer ends and a resilient strip 11 extends from lengthwise strip 10 to the axle opposite the intermediate oppositely extending paddle. It is apparent that two or more strips 10 might be used, though I usually find that one is all that is necessary.

The paddles 9 are made longer than the distance from the axle 7 to the circular bottom of the hopper so that they will strike forward of the openings 4 and be dragged across the same as they rotate in the direction indicated by the arrows thereby forcing the material through the openings 4. If the material is lumpy or has stones or other substances, as for instance slag in ashes, the spring of the paddles 9, as shown in dotted outline in Fig. 4, will prevent the paddles from being broken by such obstructions though at the same time working through a larger portion of such material than if the paddles were not resilient. The circular form of the bottom of the hopper is preferably made lower at the front part with a gradual rise in the rear portion so that the powdered material naturally gravitates to the front portion so that the blades, as they turn in the direction indicated by the arrows, will catch the same and force it into the openings 4, pressing it through the openings as the spring blades draw across said openings.

The openings 4 in the bottom of the hopper are preferably made elliptical in form and placed in series lengthwise of the hopper slightly forward of its center so that the spring blades 9 will have but a short distance to press the material through the openings. A slide 12 is provided on the under side of hopper 1 having openings 4' corresponding to those in the hopper and a lever 13 is attached to the slide 12 so that the operator sitting in seat 14 can easily enlarge or diminish the feed as he desires, the openings in the slide cutting off or graduating the openings in the hopper, as shown in Fig. 3. A rearwardly inclined distributing board 15 is attached to the under side of the hopper in front of openings 4 so that as the material drops through said openings it falls on to this inclined distributing board 15 and by the shaking of the machine as it passes over the rough ground, the material is shaken from the board, thus more thoroughly covering the entire surface of the land.

On account of the peculiar nature of the dry ashes, lime and like powdered substances used to feed the land, it is found necessary to provide movable inner sides 16 for the hopper or the material will bridge or clog. These are preferably made of sheet metal with lengthwise stiffening ribs 17. Small cleats 18 are provided on the curved bottom of the hopper each side of agitating paddles 9 so that the movable sides 16 cannot crowd on the paddles but will gradually shake down as the amount of material in the hopper diminishes until arrested against the pin 18 as shown in dotted line in Fig. 1. Elliptical springs 19 are provided between the sides of the hopper and the movable sides 16 to press said movable sides toward the center and thereby contract the space between the same as the amount of material diminishes, and also to make the movable sides resilient so that the shaking of the machine will keep them constantly moving thereby shaking the material loose and causing it to work down toward the bottom of the hopper. In order also to absolutely prevent "bridging" and in order to make it possible to break up the material the levers 20 are provided which project down between the sides 16 and the inner side of the hopper and extend out through slots 21 in the upper edge of the hopper and are pivotally attached in said slots. Two or three of these levers 20 are provided on each side of the hopper and their outer ends are connected by a rod 22. It is apparent that the operator can take hold of rod 22 and by shaking the rod up and down thereby cause the inner end of the levers 20 to agitate the movable sides 16 and shake loose any material that is clogged. I have also found it convenient with some forms of fertilizing material to attach weights 23 to the rod 22 and the movement of the machine over the rough land causes the heavy weights to continually operate the levers 20 thereby agitating the movable sides 16 and causing the fertilizer to work steadily down in the hopper. In order that sides 16 may not drop inwardly on to agitator 9, slotted lugs 27 are attached to sides 16 at the upper and outer corners and rods 28 are provided in the corners of hopper 1 upon which the slotted lugs 27 are slidably mounted. Lugs 27 allow the sides 16 to move inwardly and to slide up and down yet holds the same in place for refilling hopper 1. It is apparent that it is impossible to clog the machine with these different means of forcing the speed.

The hopper 1 preferably sets on the frame 24 which is attached to the pole 25. As the hopper must preferably be placed close to the ground with low wheels 8, I provide sled runners 26 under the central portion of the machine so that when passing over a hillock or other obstacle that would not be cleared by the low wheels, it is apparent that one wheel will turn the agitator and the other wheel may be lifted free from the ground, the machine sliding on one of the sled runners 26.

I claim as new:—

1. In a fertilizer distributer, a hopper, movable sides within said hopper, and levers extending between said movable sides and the sides of the hopper, said levers extending out of said hopper to agitate said movable sides.

2. In a fertilizer distributer, a hopper, movable sides within said hopper, springs between said movable sides and the sides of the hopper, and angular levers extending between said movable sides and the sides of the hopper, substantially as and for the purpose specified.

3. In a fertilizer distributer, an axle, wheels on the ends of said axle, a hopper having suitable bearings for said axle, and sled runners under the central portion of said hopper, substantially as and for the purpose specified.

4. In a fertilizer distributer, a hopper, an axle extending through said hopper, wheels on said axle to support and turn the same, a slide at the bottom of said hopper, said hopper and slide having a corresponding series of lengthwise elliptical openings, a series of spring arms on said axle corresponding to said series of openings to resiliently press the fertilizer through said openings, and a lengthwise connecting strip attached to said arms near their outer ends, substantially as and for the purpose specified.

5. In a fertilizer distributer, a hopper 1 having an inner curved bottom, an axle 7 extending horizontally through said hopper, wheels 8 on said axle to support and turn the same, ratchets 8' on said wheels, a slide 12 in the bottom of said hopper, said hopper and slide having a corresponding series of lengthwise elliptical openings 4, a lever 13 to move said slide, a double series of spring arms 9 on said axle corresponding to said series of openings in the hopper bottom, a lengthwise connecting strip 10 for said arms, inner movable sides 16 for said hopper, and levers 20 extending between said movable sides and hopper to agitate said movable sides, substantially as and for the purpose specified.

6. In a fertilizer distributer, a hopper 1, an axle 7 revolubly mounted in said hopper, wheels 8 attached to the ends of said axle to support and turn the same, and runners 26 on the bottom of said hopper to aid in supporting the same, substantially as and for the purpose specified.

In testimony whereof I have signed my name to this specification in the presence of two subscribing witnesses.

DAVID M. SAMUELSON.

In the presence of—
I. A. ELLSWORTH,
H. PIKE.